(12) United States Patent
Zhang

(10) Patent No.: US 11,068,771 B2
(45) Date of Patent: Jul. 20, 2021

(54) INTEGRATED NEURO-PROCESSOR COMPRISING THREE-DIMENSIONAL MEMORY ARRAY

(71) Applicant: Guobiao Zhang, Corvallis, OR (US)

(72) Inventor: Guobiao Zhang, Corvallis, OR (US)

(73) Assignees: HangZhou HaiCun Information Technology Co., Ltd., ZheJiang (CN); Guobiao Zhang, Corvallis, OR (US)

( * ) Notice: Subject to any disclaimer, the term of this patent is extended or adjusted under 35 U.S.C. 154(b) by 1133 days.

(21) Appl. No.: 15/464,347

(22) Filed: Mar. 21, 2017

(65) Prior Publication Data

US 2017/0270403 A1    Sep. 21, 2017

(30) Foreign Application Priority Data

Mar. 21, 2016 (CN) .......................... 201610162375.7
Mar. 26, 2016 (CN) .......................... 201610180422.0
Mar. 27, 2016 (CN) .......................... 201610182229.0

(51) Int. Cl.
*G06N 3/063* (2006.01)
*G06F 11/14* (2006.01)
*G11C 11/21* (2006.01)
*A61B 5/00* (2006.01)
*G06N 3/04* (2006.01)

(52) U.S. Cl.
CPC .............. *G06N 3/04* (2013.01); *G06N 3/063* (2013.01)

(58) Field of Classification Search
CPC ................................ G06N 3/04; G06N 3/063

USPC ....................................................... 706/1–62
See application file for complete search history.

(56) References Cited

U.S. PATENT DOCUMENTS

| | | | |
|---|---|---|---|
| 5,519,811 A * | 5/1996 | Yoneda ................ | G06N 3/0635 706/33 |
| 5,627,943 A * | 5/1997 | Yoneda .............. | G06K 9/00986 706/31 |
| 5,835,396 A | 11/1998 | Zhang | |
| 6,034,882 A | 3/2000 | Johnson et al. | |
| 6,067,536 A | 5/2000 | Maruyama et al. | |
| 6,199,057 B1 | 3/2001 | Tawel | |
| 6,717,222 B2 | 4/2004 | Zhang | |
| 6,861,715 B2 | 3/2005 | Zhang | |
| 7,450,414 B2 | 11/2008 | Scheuerlein | |
| 8,450,781 B2 * | 5/2013 | Rothberg ............. | C12Q 1/6869 257/253 |
| 8,700,552 B2 | 4/2014 | Yu et al. | |
| 9,153,230 B2 | 10/2015 | Maaninen | |
| 2005/0231855 A1 * | 10/2005 | Tran ........................ | G11C 11/21 360/324.1 |

(Continued)

OTHER PUBLICATIONS

Chen et al. "DaDianNao: A Machine-Learning Supercomputer", IEEE/ACM International Symposium on Micro-architecture, 5(1), pp. 609-622, 2014.

*Primary Examiner* — Brandon S Cole

(57) ABSTRACT

The present invention discloses an integrated neuro-processor comprising at least a three-dimensional memory (3D-M) array. The 3D-M array stores the synaptic weights, while the neuro-processing circuit performs neural processing. The 3-D integration between the 3D-M array and the neuro-processing circuit not only improves the computational power per die area, but also greatly increases the storage capacity per die area.

17 Claims, 15 Drawing Sheets

(56) References Cited

U.S. PATENT DOCUMENTS

| | | | |
|---|---|---|---|
| 2009/0175104 A1* | 7/2009 | Leedy | H01L 27/0688 365/200 |
| 2013/0072775 A1* | 3/2013 | Rogers | A61M 5/31 600/378 |
| 2014/0275887 A1* | 9/2014 | Batchelder | A61B 5/7278 600/324 |
| 2015/0339570 A1* | 11/2015 | Scheffler | G06N 3/04 706/16 |
| 2017/0060697 A1* | 3/2017 | Berke | G06F 11/1441 |
| 2019/0164038 A1* | 5/2019 | Zhang | G06N 3/063 |

* cited by examiner

INTEGRATED NEURO-PROCESSOR COMPRISING THREE-DIMENSIONAL MEMORY ARRAY

CROSS-REFERENCE TO RELATED APPLICATIONS

This application claims priorities from Chinese Patent Application No. 201610162375.7, filed Mar. 21, 2016; Chinese Patent Application No. 201610180422.0, filed Mar. 26, 2016; Chinese Patent Application No. 201610182229.0, filed Mar. 27, 2016, in the State Intellectual Property Office of the People's Republic of China (CN), the disclosures of which are incorporated herein by references in their entireties.

BACKGROUND

1. Technical Field of the Invention

The present invention relates to the field of integrated circuit, and more particularly to neuro-processor for artificial intelligence (AI) applications.

2. Prior Art

AI is the next big wave in computing. Artificial neural network (hereinafter, neural network) is a powerful AI tool. An exemplary neural network is shown in FIG. 1. It includes an input layer 32, a hidden layer 34 and an output layer 36. The input layer 32 comprises i neurons 22, whose input data $x_1, \ldots x_i$ form an input vector 20. The output layer 36 comprises k neurons 26, whose output data $y_1, y_2, \ldots y_k$ form an output vector 30. The hidden layer 34 is between the input layer 32 and the output layer 36. It comprises j neurons 24, each of which is coupled with a first neuron in the input layer 32 as well as coupled with a second neuron in the output layer 36. The couplings between neurons are represented by synaptic weights $w_{ij}$ and $w_{jk}$.

U.S. Pat. No. 6,199,057 issued to Tawel on Mar. 6, 2001 discloses a circuit implementation of a neuro-processor. As shown in FIG. 2A, the neuro-processor includes a synaptic-weight ($W_S$) RAM 40X, an input-neuron ($N_{in}$) RAM 40Y and a neural processing unit (NPU) 50. During operation, a synaptic weight 42 is read from the $W_S$ RAM 40X, while an input data 46 is read from the $N_{in}$ RAM 40Y. After the NPU 50 multiplies the input data 46 by the synaptic weight 42, the resulting multiplication values are summed together. This sum is passed through an activation-function circuit to generate an output data $N_{out}$ 48. Note that the $W_S$ RAM 40X in this example has a small capacity of 2k×16.

There is a clear trend towards increasingly large neural networks. Most neural networks use 1-billion to 10-billion $W_s$-parameters. Apparently, this large amount of $W_s$-parameters (on the order of GB) cannot be stored in a small $W_s$ RAM 40X. To address this issue, prior art uses the von Neumann architecture, where the $W_s$-parameters are stored in an external RAM (i.e. the main memory). However, neural networks have become computationally so intensive that the $W_s$-parameters have to be frequently written back and read from main memory. These frequent memory accesses become the performance bottleneck. It was reported that the neuro-processor loses at least an order of magnitude in performance due to memory accesses.

To solve the above memory-access problem, Chen (referring to Chen et al. "DaDianNao: A Machine-Learning Supercomputer", IEEE/ACM International Symposium on Microarchitecture, 5(1), pp. 609-622, 2014) taught a machine-learning supercomputer comprising a plurality of accelerator dice. Each accelerator die contains enough RAM so that the sum of the RAM of all dice can contain the whole neural network, thus requiring no external main memory. FIG. 2B shows the tile organization of an accelerator die 60. Each accelerator die 60 comprises an array of sixteen tiles 70. All tiles 70 are connected through a fat tree which serves to broadcast the input neuron values to each tile. At the center of the die 60, there are special eDRAM banks 66 for input and output neurons. The input-neuron values are transferred in and out rather than $W_s$-parameters because the former are orders of magnitude fewer than the latter.

The sixteen tiles 70 in the accelerator 60 have similar architecture. FIG. 2C further discloses its tile architecture. Each tile 70 comprises an NPU 50 and four eDRAM banks 40. The NPU 50 performs neural processing. It comprises 256+32 16-bit multipliers as well as 256+32 16-bit adders. The eDRAM 40 stores the $W_s$-parameters. It has a storage capacity of 2 MB. Because the eDRAM banks 40 are physically close to the NPU 50, data movement is minimized, saving both time and energy. With high internal bandwidths and low external communications, this accelerator achieves a speedup of 450.65× over a GPU; for a 64-node machine-learning supercomputer, the energy consumption is reduced by 150.31× on average.

Although having many advantages, the accelerator of Chen still has several drawbacks. First of all, from a system's perspective, even though it does not need an external main memory, this accelerator still needs an external storage for permanently storing the $W_s$-parameters, because he eDRAM banks 40 only serve as a temporary storage. Before operation, the $W_s$-parameters still need to be loaded into the eDRAM 40. This takes time. Secondly, each accelerator die 60 contains 32 MB eDRAM for the $W_s$-parameters. This number, although much larger than Tawel, is still quite small for neural networks. A typical neural network contains billions of $W_s$-parameters. To store all of them inside the eDRAM 40, hundreds of accelerator dice 60 are needed (e.g. 125 accelerator dice for one billion 32-bit $W_s$-parameters). These are too many for a mobile device. Accordingly, the accelerator 60 is not suitable for mobile applications. Thirdly, the accelerator 60 adopts an asymmetric architecture where the tile area is heavily biased towards storage rather than computation. Inside each tile, eDRAM 40 occupies nearly 80% of the area, whereas the NPU 50 occupies less than 10%. As a result, the computational power per die area is small.

A root cause of the above issues is that the integration between the eDRAM 40 and the NPU 50 is two-dimensional (2-D), i.e. both are formed at a same physical level (i.e. on the substrate). This 2-D integration leads a dilemma: more computational power per die area means less eDRAM 40 on an accelerator die 60; however, the resulting extra external-memory accesses would void much of the performance gain from the increased computational power. As long as the 2-D integration is used, this dilemma would remain. A fundamentally different integration is desired.

OBJECTS AND ADVANTAGES

It is a principle object of the present invention to advance the art of neural networks.

It is a principle object of the present invention to improve computational power per die area of a neuro-processor.

It is a principle object of the present invention to improve storage capacity per die area of a neuro-processor.

It is a further object of the present invention to provide a neuro-processor suitable for mobile applications.

In accordance with these and other objects of the present invention, the present invention discloses an integrated neuro-processor comprising at least a three-dimensional memory (3D-M) array.

SUMMARY OF THE INVENTION

The present invention discloses an integrated neuro-processor comprising at least a three-dimensional memory (3D-M) array. It not only performs neural processing, but also stores the synaptic weights used thereby. The integrated neuro-processor comprises a plurality of neural storage-processing units (NSPU), with each NSPU comprising a neuro-processing circuit and at least a 3D-M array. The neuro-processing circuit performs neural processing, while the 3D-M array stores the synaptic weights. The 3D-M array is vertically stacked above the neuro-processing circuit. This integration between the 3D-M array and the neuro-processing circuit is referred to as 3-D integration. The 3D-M array is communicatively coupled with the neuro-processing circuit through a plurality of contact vias. These coupling contact vias are collectively referred to as inter-storage-processor (ISP)-connections.

The 3-D integration has a profound effect on the computational power per die area. Because the 3D-M array is vertically stacked above the neuro-processing circuit, the footprint of an NSPU is roughly equal to that of the neuro-processing circuit. This is significantly smaller than prior art. For the 2-D integration used by prior art, the footprint of the tile 70 (equivalent to the NSPU) is roughly equal to the sum of those of the eDRAM 40 (equivalent to the 3D-M array) and the NPU 50 (equivalent to the neuro-processing circuit). Recalling that the NPU 50 occupies less than 10% of the tile area and the eDRAM 40 occupies ~80% of the tile area, it can be concluded that, after moving the memory array storing the synaptic weights from aside to above, the NSPU could be ~10× smaller than the tile 70 of prior art. Accordingly, the integrated neuro-processor could contain ~10× more NSPUs per die area than prior art and therefore, is ~10× more computationally powerful. The integrated neuro-processor supports more massive parallelism.

The 3-D integration also has a profound effect on the storage capacity per die area. Because each 3D-M cell occupies ~4 $F^2$ die area whereas each eDRAM cell occupies >100 $F^2$ die area (F is the minimum feature size for a processing node, e.g. 14 nm), 3D-M is more area-efficient. Adding the fact that the 3D-M comprises multiple memory levels (e.g. 4 memory levels) whereas the eDRAM comprises only a single memory level, the integrated neuro-processor has significantly more (~100×) storage capacity per die area than prior art. Considering that a 3D-XPoint die has a storage capacity of 128 Gb, the integrated neuro-processor can easily store up to 16 GB of synaptic weights. This is more than enough for most AI applications. Because a single or few integrated neuro-processor dice can store the synaptic weights of a whole neural network, the integrated neuro-processor is suitable for mobile applications.

Accordingly, the present invention discloses an integrated neuro-processor, comprising: a semiconductor substrate having transistors thereon; an array of neural storage-processing units (NSPU) formed on said semiconductor substrate, each of said NSPUs comprising at least a first three-dimensional memory (3D-M) array and a neuro-processing circuit, wherein said first 3D-M array is stacked above said neuro-processing circuit, said 3D-M array storing at least a synaptic weight; said neuro-processing circuit is formed on said substrate, said neuro-processing circuit performing neural processing with said synaptic weight; said first 3D-M array and said neuro-processing circuit are communicatively coupled by a plurality of contact vias.

The present invention further discloses an integrated neuro-processor, comprising: a semiconductor substrate having transistors thereon; an array of neural storage-processing units (NSPU) formed on said semiconductor substrate, each of said NSPUs comprising at least a first three-dimensional memory (3D-M) array and a neuro-processing circuit, wherein said first 3D-M array is stacked above said neuro-processing circuit, said 3D-M array storing at least a synaptic weight; said neuro-processing circuit is formed on said substrate, said neuro-processing circuit comprising a multiplier, wherein one input of said multiplier is said synaptic weight; said first 3D-M array and said neuro-processing circuit are communicatively coupled by a plurality of contact vias.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

Figure 1:
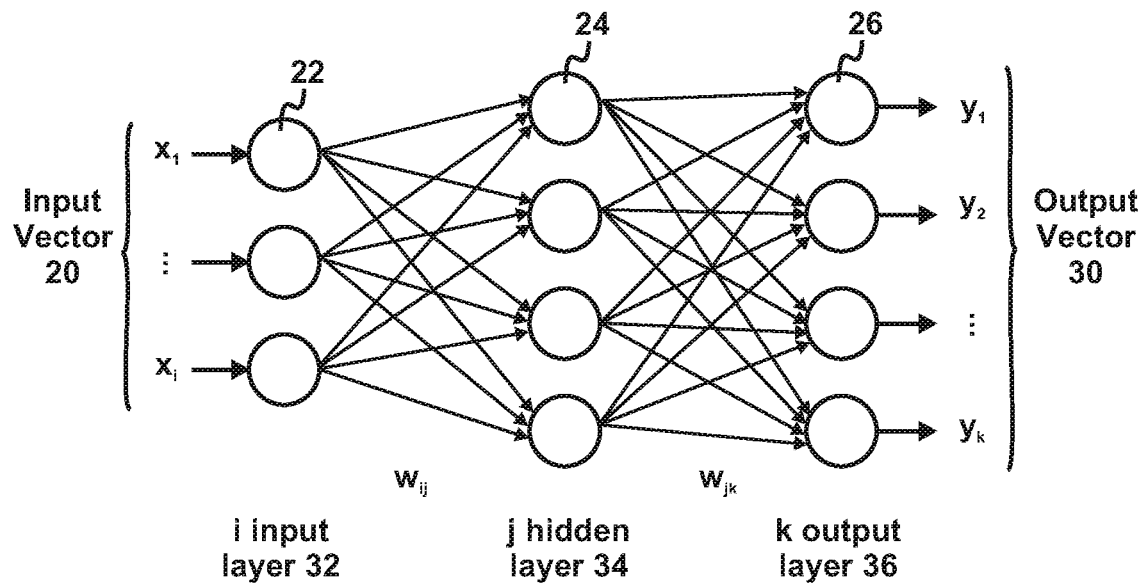
FIG. 1 is a schematic view of a neural network.

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

Throughout the present invention, the phrase "memory" is used in its broadest sense to mean any semiconductor-based holding place for information, either permanent or temporary; the phrase "storage" is used in its broadest sense to mean any permanent holding place for information; the phrase "permanent" is used in its broadest sense to mean any long-term storage; the phrase "communicatively coupled" is used in its broadest sense to mean any coupling whereby information may be passed from one element to another element.

Furthermore, the phrase "on the substrate" means the functional elements of a circuit component (e.g. transistors) are formed on the surface of the substrate, while the interconnects between these functional elements may be formed above the substrate, i.e. they do not touch the substrate. On the other hand, the phrase "above the substrate" means the functional elements (e.g. memory cells) are formed above the substrate, i.e. they do not touch the substrate.

In other publications, the term "neural processing unit" is also referred to as "neural functional unit" and the like; the term "neuro-processor" is also referred to as "accelerator", "neural-network accelerator", "machine-learning accelerator" and the like. The symbol "/" means a relationship of "and" or "or".

DETAILED DESCRIPTION OF THE
PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Figure 3:
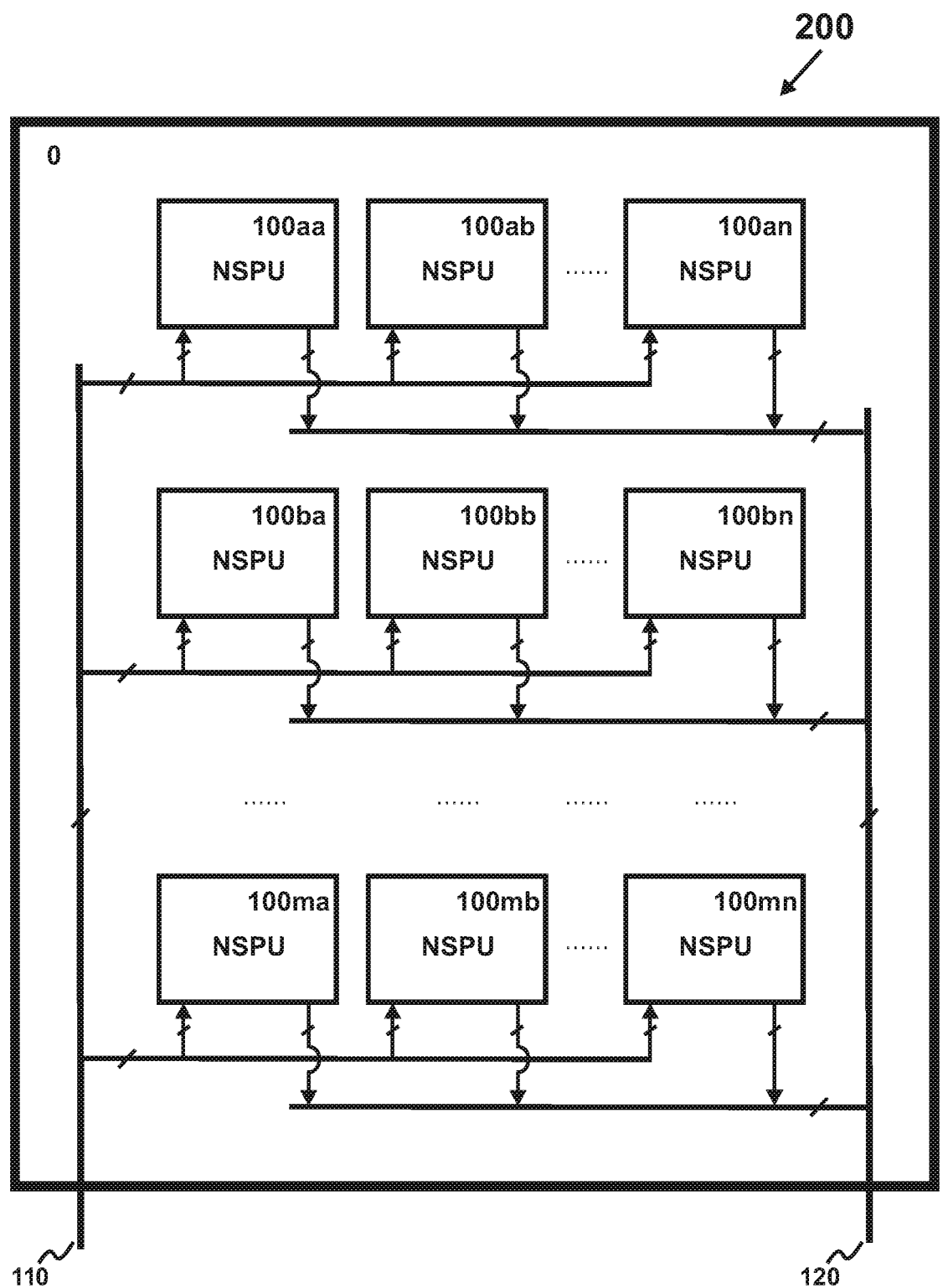
FIG. 3 is a schematic view of a preferred integrated neuro-processor.

Referring now to FIG. 3, a preferred distributed neuro-processor die 200 is disclosed. It not only performs neural processing, but also stores the synaptic weights used thereby. The preferred distributed neuro-processor 200 is formed on a single piece of a semiconductor substrate 0. It comprises m*n neural storage-processing units (NSPU) 100aa-100mn. Each NSPU is commutatively coupled with an input bus 110 and an output bus 120. A real-life distributed neuro-processor 200 could comprise tens of thousands of NSPUs. For example, a distributed neuro-processor 200 with a 128 Gb storage capacity comprises 64,000 NSPUs. This large number of NSPUs ensures massive parallelism for neural processing.

Figure 4A:
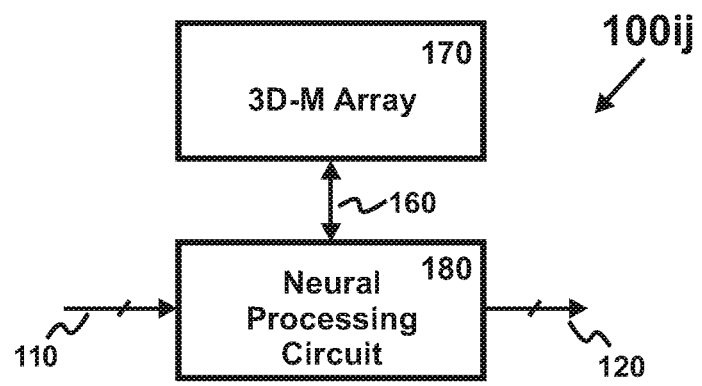
FIGS. 4A-4C are the circuit block diagrams of three preferred neural storage-processing units (NSPU)
Figure 4B:
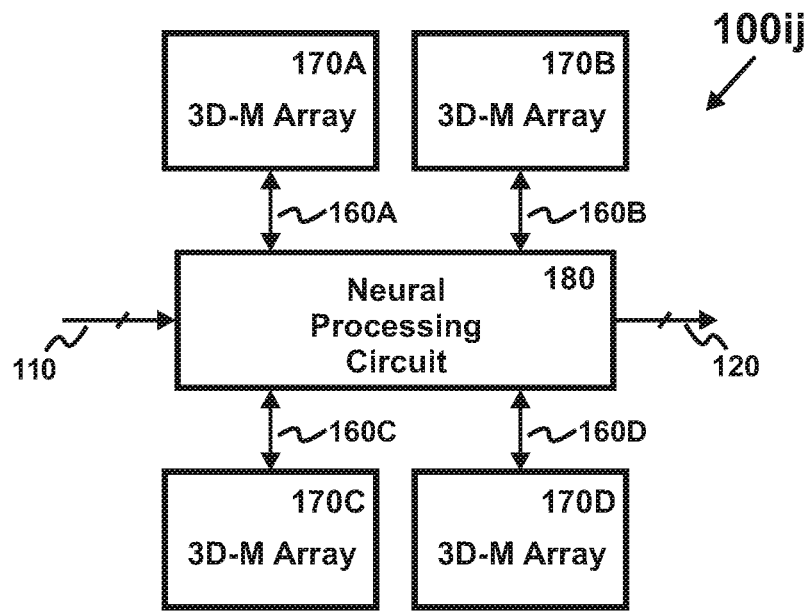
Figure 4C:
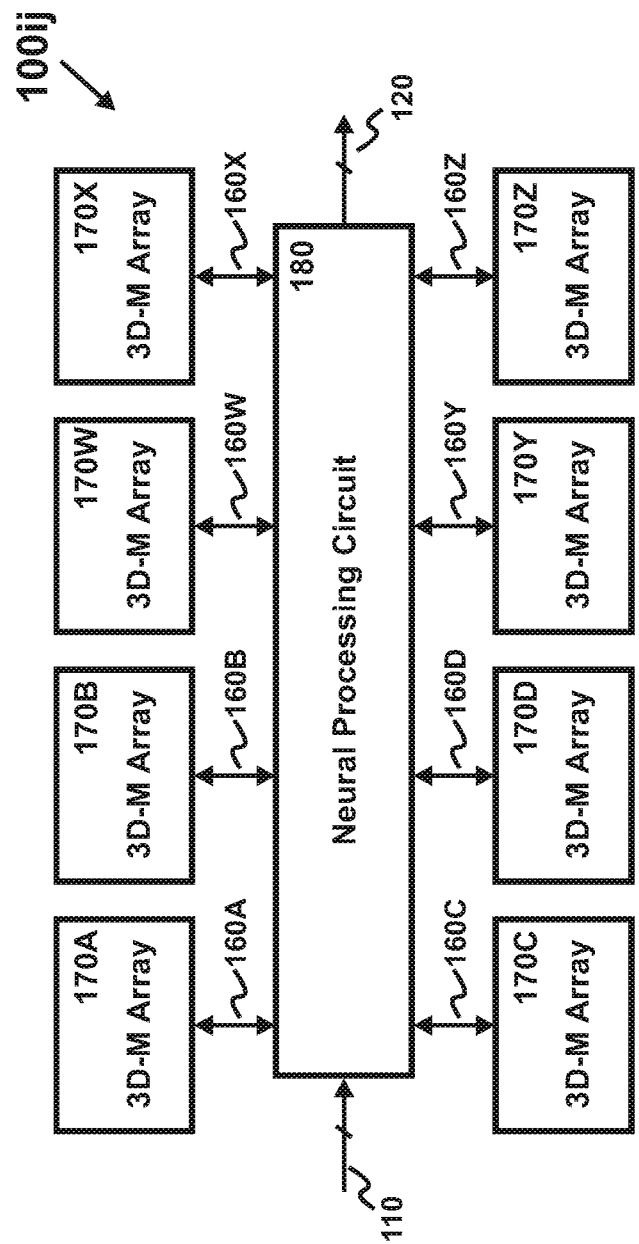

FIGS. 4A-4C disclose three preferred NSPUs 100ij. Each NSPU 100ij comprises a neuro-processing circuit 180 and at least a 3D-M array 170 (or, 170A-170D, 170W-170Z), which are communicatively coupled through an inter-storage-processor (ISP)-connection 160 (or, 160A-160D, 160W-160Z). The neuro-processing circuit 180 performs neural processing, while the 3D-M array 170 stores the synaptic weights. In these embodiments, the neuro-processing circuit 180 serves different number of 3D-M arrays. In the first embodiment of FIG. 4A, the neuro-processing circuit 180 serves a single 3D-M array 170. In the second embodiment of FIG. 4B, the neuro-processing circuit 180 serves four 3D-M arrays 170A-170D. In the third embodiment of FIG. 4C, the neuro-processing circuit 180 serves eight 3D-M array 170A-170D, 170W-170Z. As will become apparent in FIGS. 7A-7C, the more 3D-M arrays it serves, the more functionality will the neural-processing circuit 180 have.

Figure 5A:
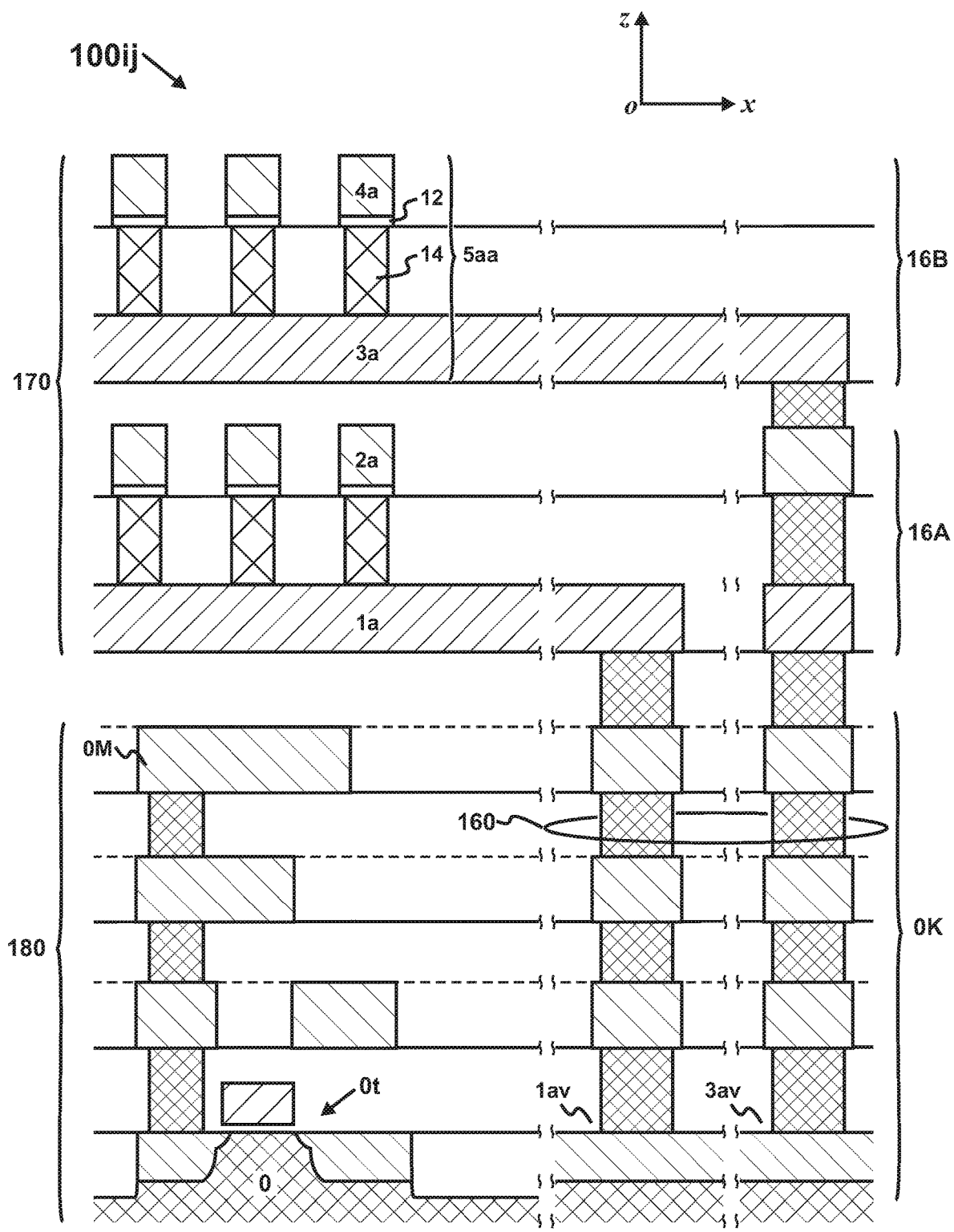
FIG. 5A is a cross-sectional view of a preferred NSPU comprising at least a three-dimensional writable memory (3D-W) array.
Figure 5B:
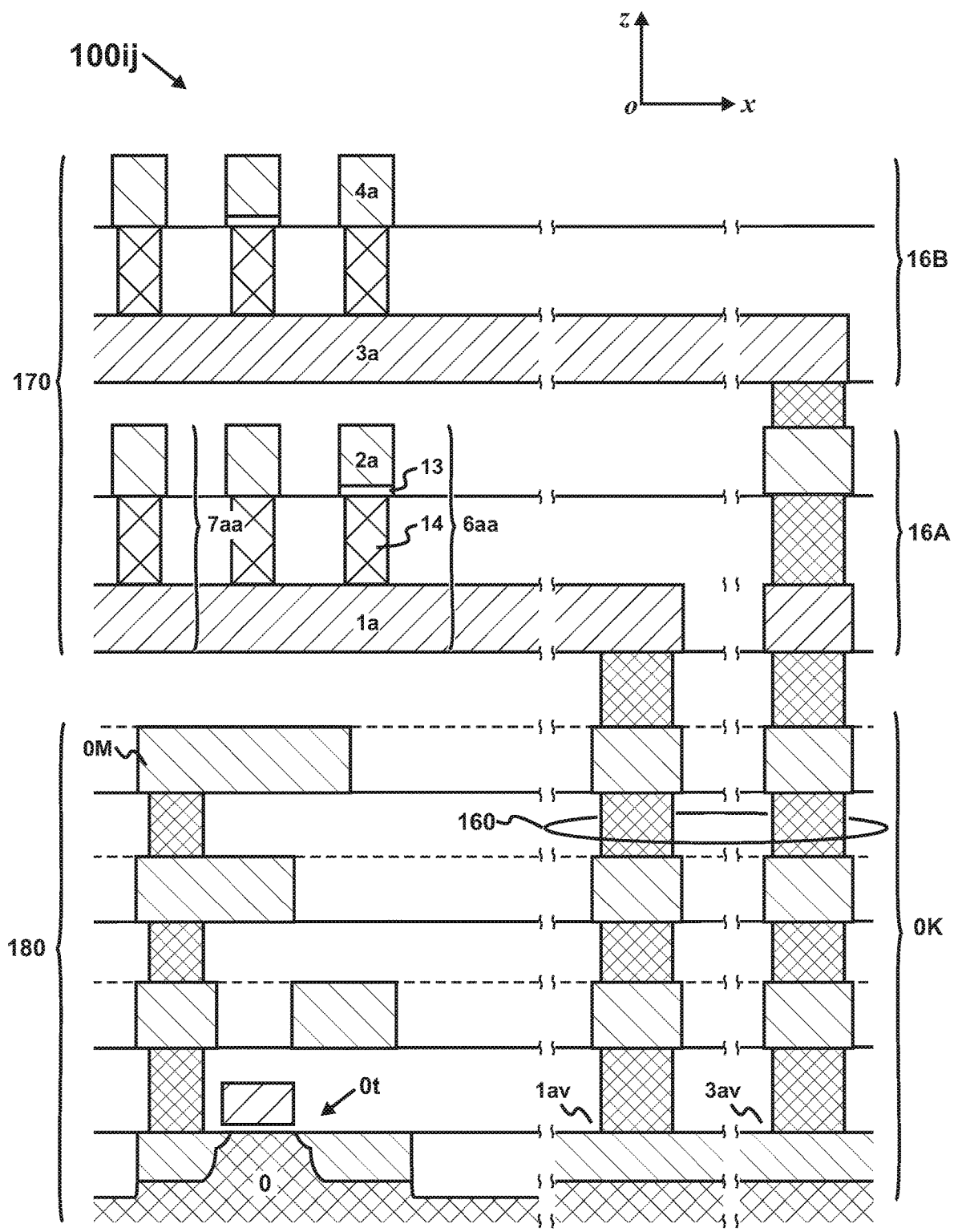
FIG. 5B is a cross-sectional view of a preferred NSPU comprising at least a three-dimensional printed memory (3D-P) array.
Figure 6:
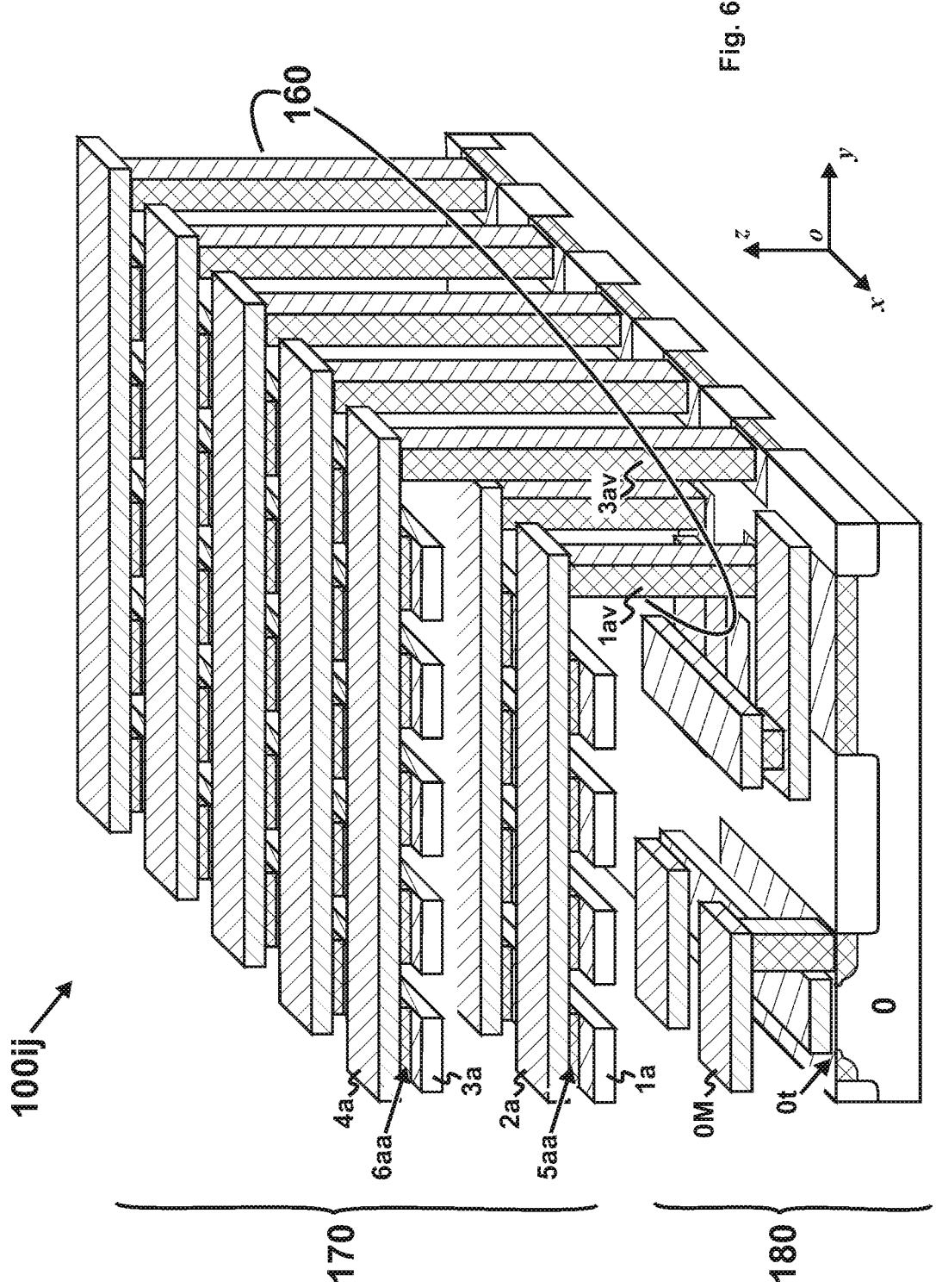
FIG. 6 is a perspective view of a preferred NSPU.

Referring now to FIGS. 5A-6, different types of the 3D-M are disclosed. The 3D-M has been disclosed in previous 3D-M patents, e.g. U.S. Pat. No. 5,835,396 issued to Zhang on Nov. 10, 1998. A 3D-M die comprises a plurality of vertically stacked memory levels, with each memory level comprising a plurality of 3D-M arrays. Each 3D-M array is a collection of 3D-M cells in a memory level that share at least one address-line. A 3D-M die further comprises an array of 3D-M blocks. Each 3D-M block is a piece of the 3D-M die whose topmost memory level comprises a single 3D-M array and whose boundary is same as the boundary of this topmost 3D-M array.

The 3D-M can be categorized into 3D-RAM (random access memory) and 3D-ROM (read-only memory). As used herein, the phrase "RAM" is used in its broadest sense to mean any memory for temporarily holding information, including but not limited to registers, SRAM, and DRAM; the phrase "ROM" is used in its broadest sense to mean any memory for permanently holding information, wherein the information being held could be either electrically alterable or un-alterable. Most 3D-M under development is 3D-ROM. The 3D-ROM is further categorized into 3-D writable memory (3D-W) and 3-D printed memory (3D-P).

For the 3D-W, data can be electrically written (or, programmable). Based on the number of programmings allowed, a 3D-W can be categorized into three-dimensional one-time-programmable memory (3D-OTP) and three-dimensional multiple-time-programmable memory (3D-MTP). The 3D-OTP can be written once, while the 3D-MTP is electrically re-programmable. An exemplary 3D-MTP is 3D-XPoint. Other types of 3D-MTP include memristor, resistive random-access memory (RRAM or ReRAM), phase-change memory, programmable metallization cell (PMC), conductive-bridging random-access memory (CBRAM), and the like.

For the 3D-P, data are recorded thereto using a printing method during manufacturing. These data are fixedly recorded and cannot be changed after manufacturing. The printing methods include photo-lithography, nano-imprint, e-beam lithography, DUV lithography, and laser-programming, etc. An exemplary 3D-P is three-dimensional mask-programmed read-only memory (3D-MPROM), whose data are recorded by photo-lithography. Because electrical programming is not required, a memory cell in the 3D-P can be biased at a larger voltage during read than the 3D-W. Thus, the 3D-P is faster in read than the 3D-W.

FIG. 5A discloses an NSPU 100ij comprising at least a 3D-W array. It comprises a substrate circuit 0K formed on the substrate 0. A first memory level 16A is stacked above the substrate circuit 0K, with a second memory level 16B stacked above the first memory level 16A. The substrate circuit 0K includes the peripheral circuits of the memory levels 16A, 16B. It comprises transistors 0t and the associated interconnect 0M. Each of the memory levels (e.g. 16A, 16B) comprises a plurality of first address-lines (i.e. y-lines, e.g. 2a, 4a), a plurality of second address-lines (i.e. x-lines, e.g. 1a, 3a) and a plurality of 3D-W cells (e.g. 5aa). The first and second memory levels 16A, 16B are coupled to the substrate circuit 0K through contact vias 1av, 3av, respectively. Because they couple the 3D-M array 170 and the neuro-processing circuit 180, the contacts vias 1av, 3av are collectively referred to as inter-storage-processor (ISP) connections 160.

The 3D-W cell 5aa comprises a programmable layer 12 and a diode layer 14. The programmable layer 12 could be an antifuse layer (which can be programmed once and is used for the 3D-OTP) or a re-programmable layer (which is used for the 3D-MTP). The diode layer 14 is broadly interpreted as any layer whose resistance at the read voltage is substantially lower than when the applied voltage has a magnitude smaller than or polarity opposite to that of the read voltage. The diode could be a semiconductor diode (e.g. p-i-n silicon diode), or a metal-oxide (e.g. $TiO_2$) diode.

FIG. 5B discloses an NSPU 100ij comprising at least a 3D-P array. It has a structure similar to that of FIG. 5A except for the memory cells. 3D-P has at least two types of memory cells: a high-resistance 3D-P cell 6aa, and a low-resistance 3D-P cell 7aa. The low-resistance 3D-P cell 7aa comprises a diode layer 14, while the high-resistance 3D-P cell 6aa comprises at least a high-resistance layer 13. The diode layer 14 is similar to that in the 3D-W. The high-resistance layer 13, on the other hand, could simply be a layer of an insulating dielectric. As an example, the high-resistance layer 12 comprises a layer of silicon oxide ($SiO_2$). This high-resistance layer 13 is physically removed at the location of the low-resistance 3D-P cell 7aa during manufacturing.

FIG. 6 is a perspective view of the NSPU 100ij. The 3D-M array 170 is vertically stacked above the neuro-processing circuit 180. The neuro-processing circuit 180 is located on the substrate 0 and is at least partially covered by the 3D-M array 170. The 3-D integration moves the 3D-M array 170 physically closer to the neuro-processing circuit 180. Because the contact vias 1av, 3av coupling the 3D-M array 170 and the neuro-processing circuit 180 are short (on the order of an um in length) and numerous (thousands at least), the ISP-connections 160 would have an extremely large bandwidth. This bandwidth is much larger than prior art. For the 2-D integration used by prior art, the eDRAM 40 and the NPU 50 are placed side-by-side on the substrate 0. The interconnects coupling them are much longer (hundreds of ums in length) and fewer (hundreds at most).

Figure 7A:
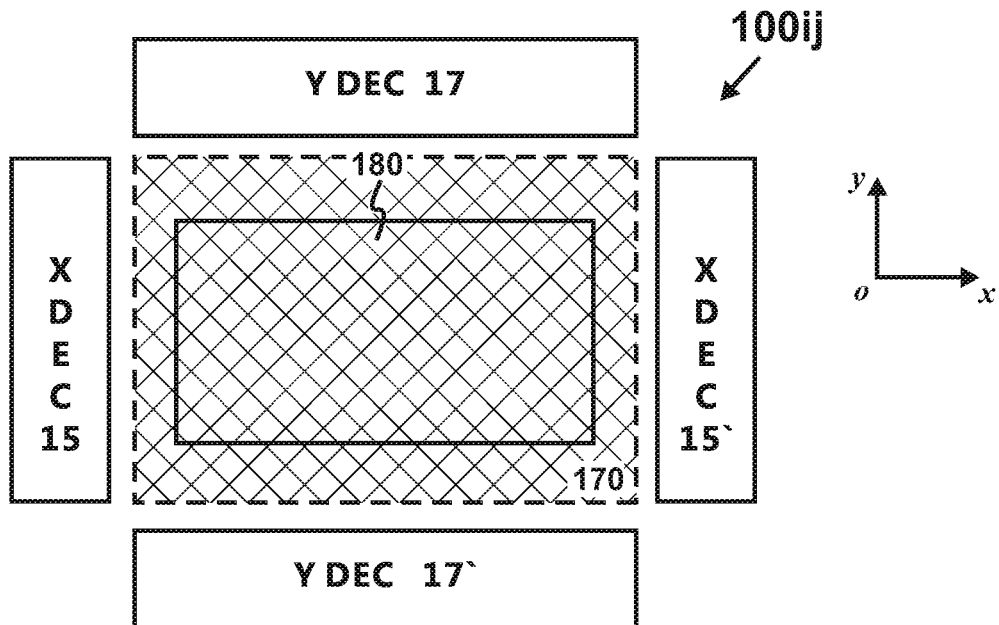
FIGS. 7A-7C are the substrate layout views of three preferred NSPUs.
Figure 7B:
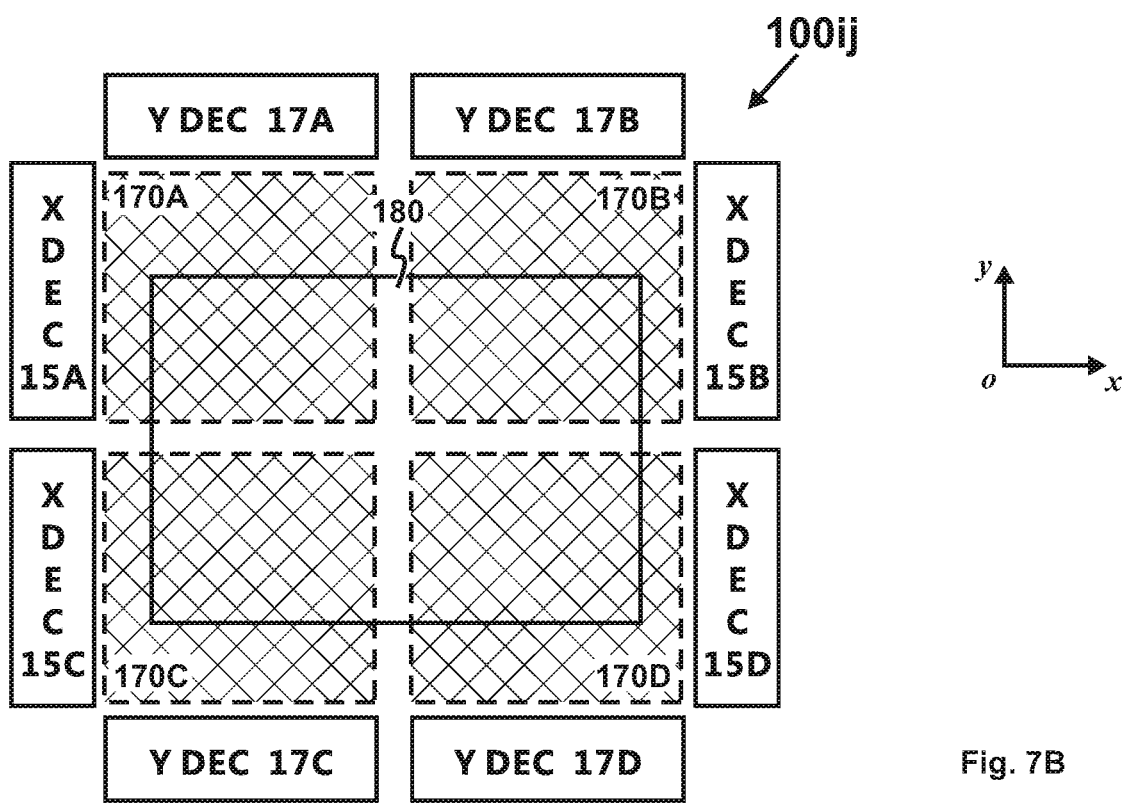
Figure 7C:
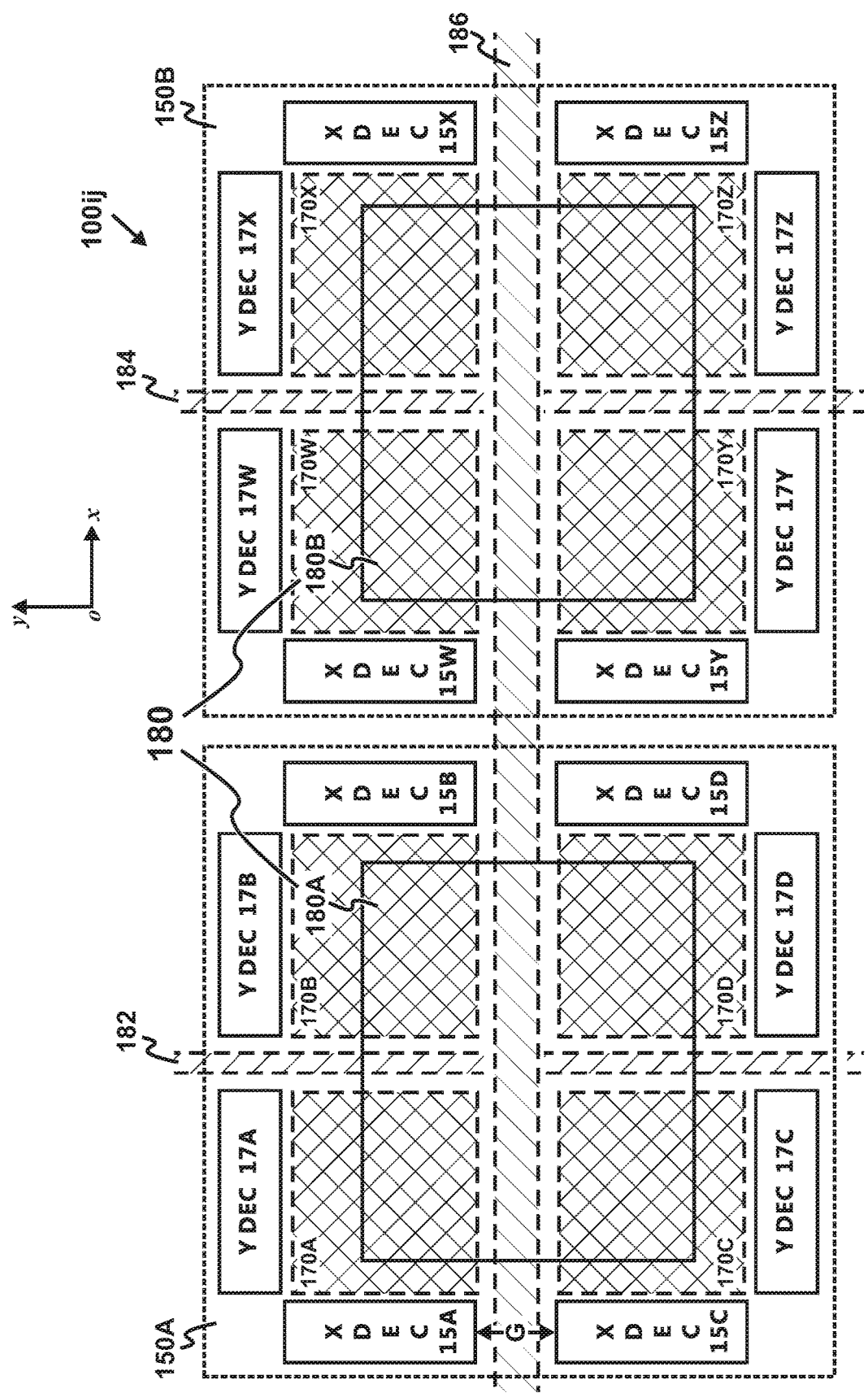

Referring now to FIGS. 7A-7C, the substrate layout views of three preferred NSUPs 100ij are shown. The embodiment of FIG. 7A corresponds to the NSPU 100iji of FIG. 4A. The neuro-processing circuit 180 serves a single 3D-M array 170. It is fully covered by the 3D-M array 170. The 3D-M array 170 has four peripheral circuits, including x-decoders 15, 15' and y-decoders 17, 17'. The neuro-processing circuit 180 is bound by these four peripheral circuits. As the 3D-M array 170 is stacked above the substrate 0 and does not occupy any substrate area, its projection on the substrate 0, not the 3D-P array 170 itself, is shown in the area enclosed by dashed lines in this and subsequent figures.

Because it is bound on four sides by the peripheral circuits 15, 15', 17, 17', the neuro-processing circuit 180 occupies a small die area and has limited functionalities. It is a simple neuro-processing circuit. Apparently, complex neural processing requires a larger processor area. FIGS. 7B-7C disclose two preferred complex neuro-processing circuits 180.

The embodiment of FIG. 7B corresponds to the NSPU 100ij of FIG. 4B. The neuro-processing circuit 180 serves four 3D-M arrays 170A-170D. Each 3D-M array (e.g. 170) has two peripheral circuits (e.g. x-decoder 15A and y-decoder 17A). Below these four 3D-M arrays 170A-170D, the neuro-processing circuit 180 is formed. Apparently, this neuro-processing circuit 180 could be four times as large as that of FIG. 7A. It can perform complex neural processing.

The embodiment of FIG. 7C corresponds to the NSPU 100ij of FIG. 4C. The neuro-processing circuit 180 serves eight 3D-M arrays 170A-170D, 170W-170Z. These 3D-M arrays are divided into two sets: a first set 150A includes four 3D-M arrays 170A-170D, and a second set 150B includes four 3D-M arrays 170W-170Z. Below the four 3D-M arrays 170A-170D of the first set 150A, a first component 180A of the neuro-processing circuit 180 is formed. Similarly, below the four 3D-M array 170W-170Z of the second set 150B, a second component 180B of the neuro-processing circuit 180 is formed. In this embodiment, adjacent peripheral circuits (e.g. adjacent x-decoders 15A, 15C, or, adjacent y-decoders 17A, 17B) are separated by physical gaps (e.g. G). These physical gaps allow the formation of the routing channel 182, 184, 186, which provide coupling between different components 180A, 180B, or between different neuro-processing circuits. Apparently, the neuro-processing circuit 180 of FIG. 7C could be eight times as large as that of FIG. 7A. It can perform more complex neural processing.

Figure 2A:
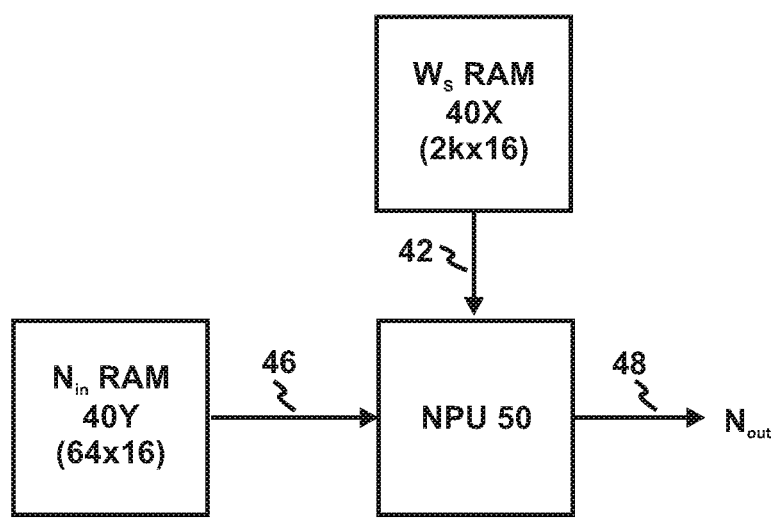
FIG. 2A is a circuit block diagram of a neuro-processor (prior art)
Figure 2B:
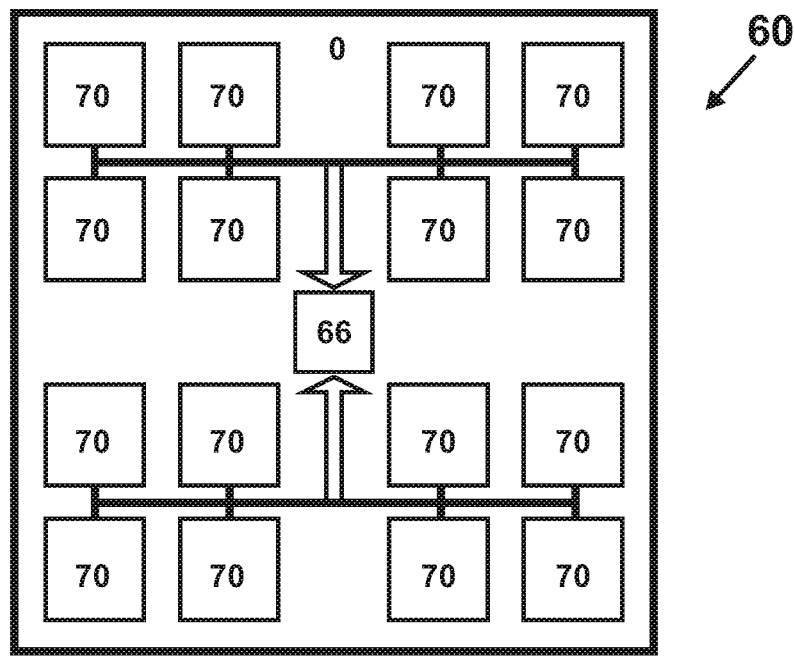
FIG. 2B shows the tile organization of an accelerator (prior art)
Figure 2C:
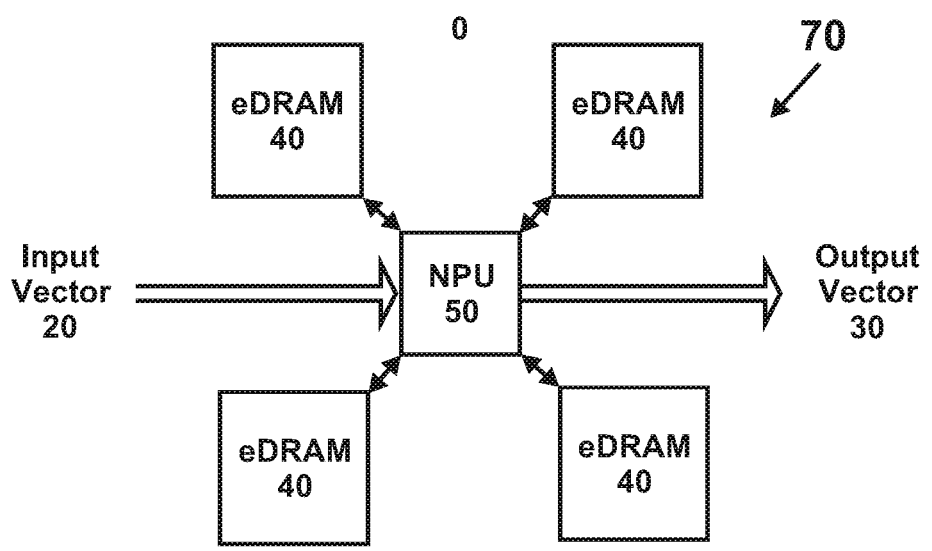
FIG. 2C shows a tile architecture of the accelerator of FIG. 2B.

The 3-D integration has a profound effect on the computational power per die area. Because the 3D-M array 170 is vertically stacked above the neuro-processing circuit 180 (FIGS. 5A-6), the footprint of an NSPU 100ij is roughly equal to that of the neuro-processing circuit 180 (FIGS. 7A-7C). This is significantly smaller than prior art. For the 2-D integration used by prior art, the footprint of the tile 70 (equivalent to the NSPU) is roughly equal to the sum of those of the eDRAM 40 (equivalent to the 3D-M array) and the NPU 50 (equivalent to the neuro-processing circuit) (FIG. 2C). Recalling that the NPU 50 occupies less than 10% of the tile area and the eDRAM 40 occupies ~80% of the tile area, it can be concluded that, after moving the memory array storing the synaptic weights from aside to above, the NSPU 100ij could be ~10× smaller than the tile 70 of prior art. Accordingly, the integrated neuro-processor 200 could contain ~10× more NSPUs per die area than prior art and therefore, is ~10× more computationally powerful. The integrated neuro-processor 200 supports more massive parallelism.

The 3-D integration also has a profound effect on the storage capacity per die area. Because each 3D-M cell occupies ~4 $F^2$ die area whereas each eDRAM cell occupies >100 $F^2$ die area (F is the minimum feature size for a processing node, e.g. 14 nm), 3D-M is more area-efficient. Adding the fact that the 3D-M comprises multiple memory levels (e.g. 4 memory levels) whereas the eDRAM comprises only a single memory level, the preferred integrated neuro-processor 200 has significantly more (~100×) storage capacity per die area than prior art. Considering that a 3D-XPoint die has a storage capacity of 128 Gb, the preferred integrated neuro-processor 200 can easily store up to 16 GB of synaptic weights. This is more than enough for most AI applications. Because a single or few integrated neuro-processor dice can store the synaptic weights of a whole neural network, the integrated neuro-processor is suitable for mobile applications.

In the preferred embodiments of FIGS. 5A-5B, the 3D-M array 170 is a 3D-ROM array (either 3D-W or 3D-P), which permanently stores the synaptic weights. Depending on usage, the 3D-ROM could be 3D-P, 3D-OTP or 3D-MTP. For example, when used for training, the 3D-M array is preferably a 3D-MTP because the values of the synaptic weights are changed frequently; however, when used for inference, the 3D-M array could be a 3D-OTP or 3D-P because the values of the synaptic weights are fixed. While the 3D-P has a faster speed, the 3D-OTP offers the user configurability.

When the storage capacity of the 3D-ROM is large enough (e.g. on the order of GB) so that all values of the synaptic weights can be stored internally, a neuro-processing system (i.e. a system comprising an integrated neuro-processor, e.g. a machine-learning supercomputer) does not need to use an external main memory or an external storage.

The synaptic weights can be directly fetched from an internal 3D-M array 170. This simplifies the system design. More importantly, because no data is transferred to and from the external main memory or the external storage, the "memory wall" in the von Neumann architecture is avoided.

Figure 8:
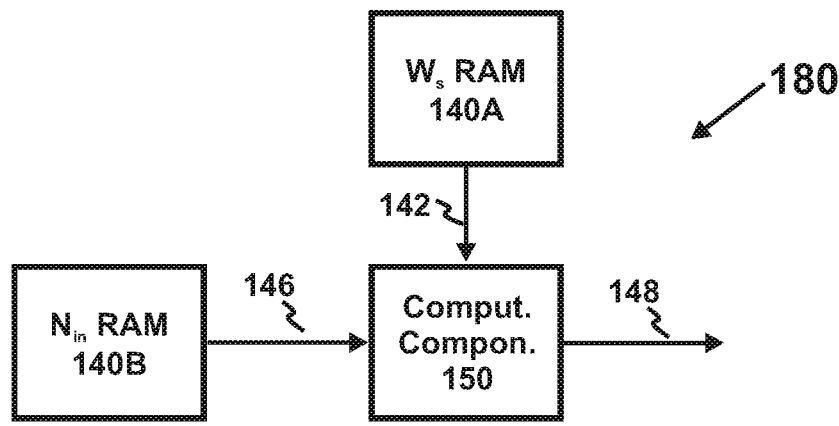
FIG. 8 is a circuit block diagram of a preferred neural processing circuit.
Figure 9A:
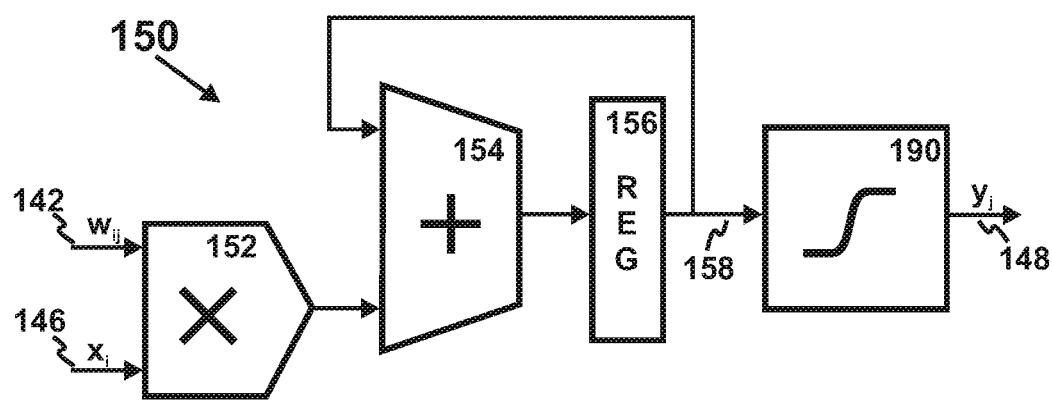
FIGS. 9A-9B are the circuit block diagrams of two preferred computing components.
Figure 9B:
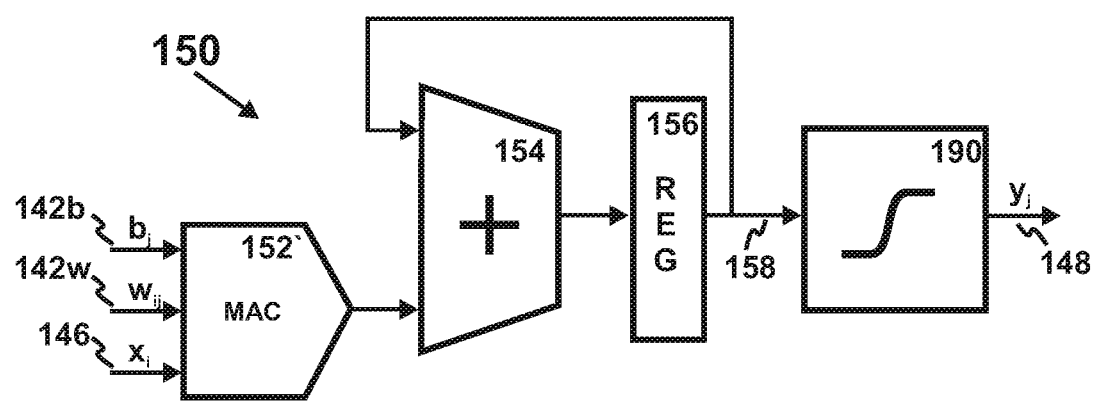

Referring now to FIGS. 8-9B, a preferred neural processing circuit 180 and its computing components 150 are disclosed. In the preferred embodiment of FIG. 8, the preferred neural processing circuit 180 comprises a synaptic-weight ($W_s$) RAM 140A, an input-neuron ($N_{in}$) RAM 140B, and a computing component 150. The $W_s$ RAM 140A is a buffer RAM which temporarily stores the synaptic weights 142 read from the 3D-M array(s) 170. The $N_{in}$ RAM 140B is another buffer RAM which temporarily stores the input data 146 from the input 110. The computing component 150 performs the neural processing before generating an output data 148.

In the preferred embodiment of FIG. 9A, a first preferred computing component 150 comprises a multiplier 152, an adder 154, a register 156 and an activation-function circuit 190. The multiplier 152 multiplies the input data $x_i$ with the synaptic weight $w_{ij}$. Then the adder 154 and the register 156 together perform accumulative addition for the multiplication results (i.e. $w_{ij}*x_i$). The resulting accumulative sum 158 is passed through the activation-function circuit 190 to generate the output data $y_j$.

In the preferred embodiment of FIG. 9B, a second preferred computing component 150 comprises a multiply-accumulate circuit (MAC) 152' in place of the multiplier 152 of FIG. 9A. Of course, the MAC 152' comprises a multiplier too. The $W_s$ RAM 140A outputs not only a synaptic weight $w_{ij}$ (through port 142w), but also a bias $b_j$ (through port 142b). The MAC 152' performs a biased-multiplication (i.e. $w_{ij}*x_i+b_j$) for the input data $x_i$, the synaptic weight $w_{ij}$ and the bias $b_j$.

The activation function (e.g. a sigmoid function, a signum function, a threshold function, a piecewise-linear function, a step function, a tanh function, etc.) controls the amplitude of its output to be between certain values (e.g. between 0 and 1 or between −1 and 1). It is difficult to realize. Tawel disclosed an activation-function circuit using a look-up table (LUT). It comprises a ROM which stores the LUT of the activation function. Like other prior art, the ROM storing the LUT is formed on the substrate, i.e. on the same physical level as the other components (e.g. RAMs 40X, 40Y, NPU 50) of the neuro-processor. This type of the 2-D integration has the same drawback as those faced by other prior art. Because the inclusion of the ROM (for the LUT) expands the area of the NPU 50, the computational power per die area will be lowered, so will the storage capacity per die area (for the synaptic weights).

Figure 10A:
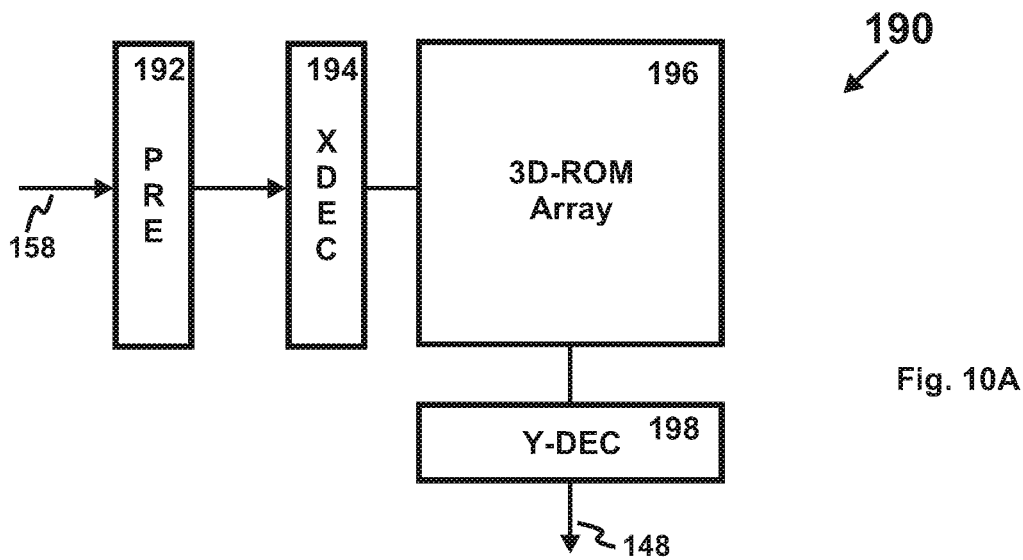
FIG. 10A is a circuit block diagram of a preferred activation-function circuit based on the 3D-ROM LUT.
Figure 10B:
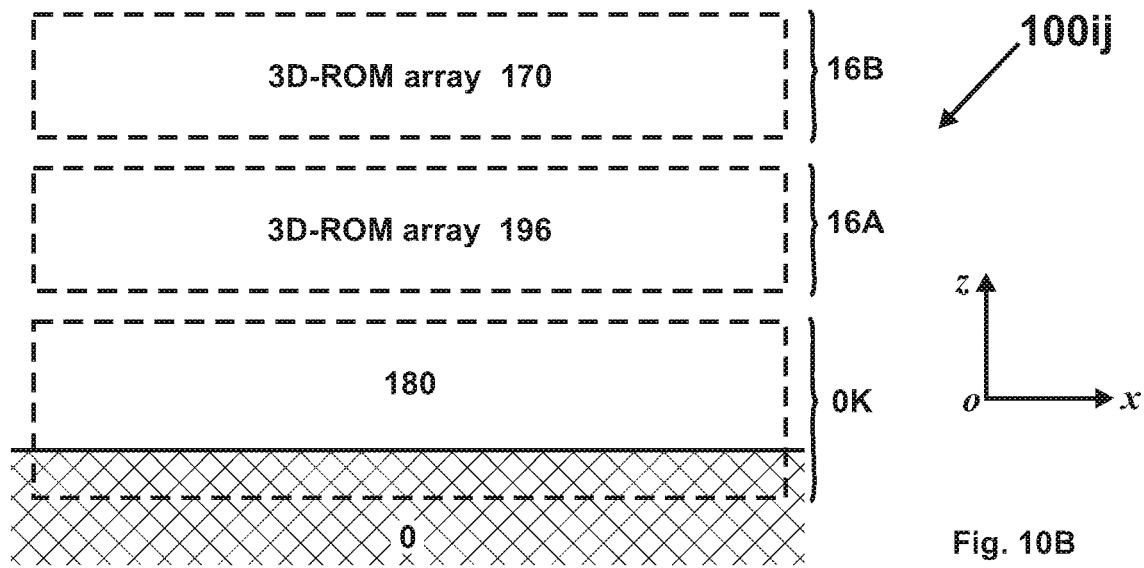
FIG. 10B is a simplified cross-sectional view of the preferred activation-function circuit as well as other components of the NSPU.

Following the same inventive spirit of the present invention, besides storing the synaptic weights, at least a 3D-M array on at least one memory level can be used to store the LUT for the activation function. Because the LUT is to be stored permanently, the 3D-M array is preferably a 3D-ROM array. FIGS. 10A-10B disclose a preferred activation-function circuit 190 based on a 3D-ROM LUT. From the circuit block diagram of FIG. 10A, the preferred activation-function circuit 190 comprises a pre-processor 192, an X-decoder 194, a 3D-ROM array 196 and a Y-decoder 198. The 3D-ROM array 196 stores the LUT of the activation function. The pre-processor 192 first converts the accumulative sum 158 to an address of the 3D-ROM array 196. Then the X-decoder 194 selects the corresponding memory cells in the 3D-ROM array 196. After that, the information stored in these memory cells is read out through the Y-decoder 198.

From the simplified cross-sectional view of FIG. 10B, the preferred NSPU 100ij comprises a neuro-processing circuit 180 formed on the substrate 0, a first 3D-ROM array 196 stacked above the neuro-processing circuit 180, and a second 3D-ROM array 170 stacked above the first 3D-ROM array 196. The first 3D-ROM array 196 stores the LUT of the activation function, whereas the second 3D-ROM array 170 stores the synaptic weights. For clarity, only sketchy boundaries of these circuit blocks are drawn as dashed lines in this and subsequent simplified cross-sectional views; no details of these circuit blocks are shown.

Since the activation function is now realized by the 3D-ROM array 196, the computing component 150 becomes quite simple—it only needs to realize multiplication and addition, but not activation function. As a result, the preferred computing component 150 based on the 3D-ROM LUT occupies a smaller die area than if the activation function is realized otherwise. Thus, the neuro-processing circuit 180 may use the simple neuro-processing circuit of FIG. 7A. Apparently, a smaller computing component 150 would lead to more computational power per die area. This is another advantage of the preferred activation-function circuit based on the 3D-ROM LUT.

In FIG. 10B, the 3D-ROM arrays 170, 196 store two types of data: the synaptic weights and the LUT of the activation function. These two types of data have different requirements on the 3D-ROM array. The LUT generally requires fast read and therefore, a 3D-P array is more appropriate. On the other hand, the synaptic weights may change frequently and therefore, a 3D-W array is more appropriate. Accordingly, the present invention further discloses a hybrid 3D-M block, wherein the 3D-M arrays on different memory levels are of different types. As defined before, a 3D-M block is a piece of the 3D-M die whose topmost memory level comprises a single 3D-M array and whose boundary is same as the boundary of this topmost 3D-M array.

Figure 11A:
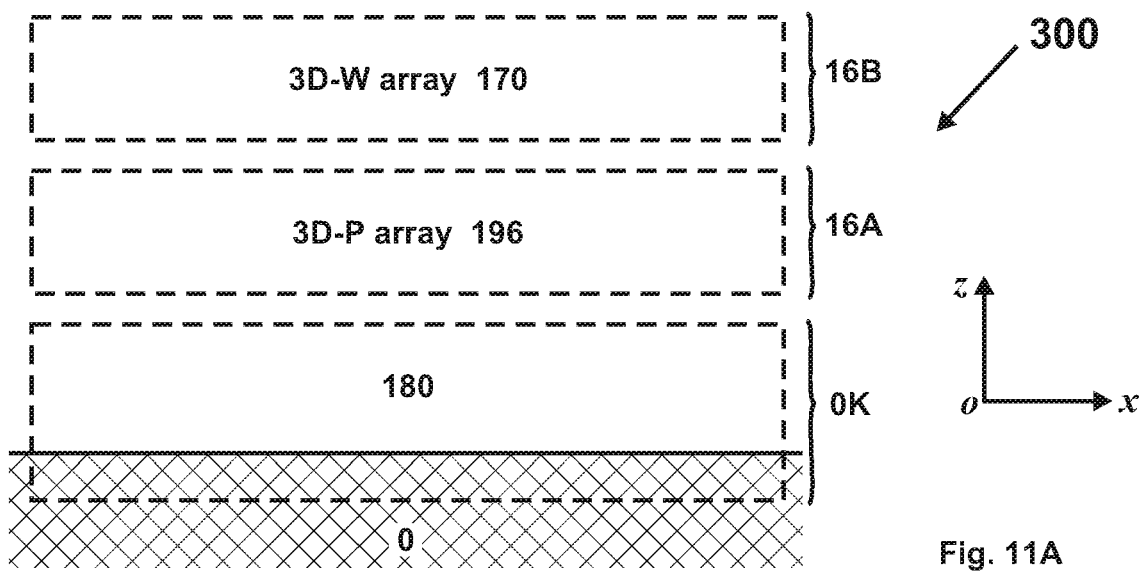
FIG. 11A is a simplified cross-sectional view of a first preferred hybrid 3D-M block.
Figure 11C:
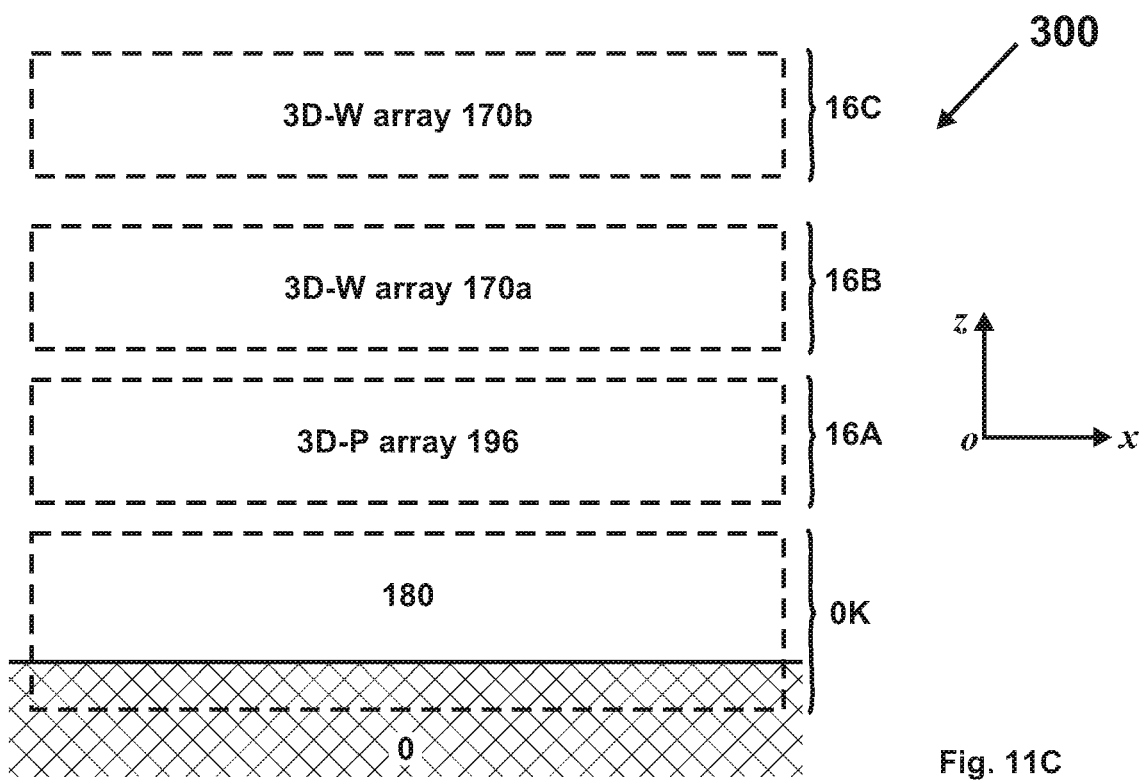
FIG. 11C is a simplified cross-sectional view of a second preferred hybrid 3D-M block.
Figure 11B:
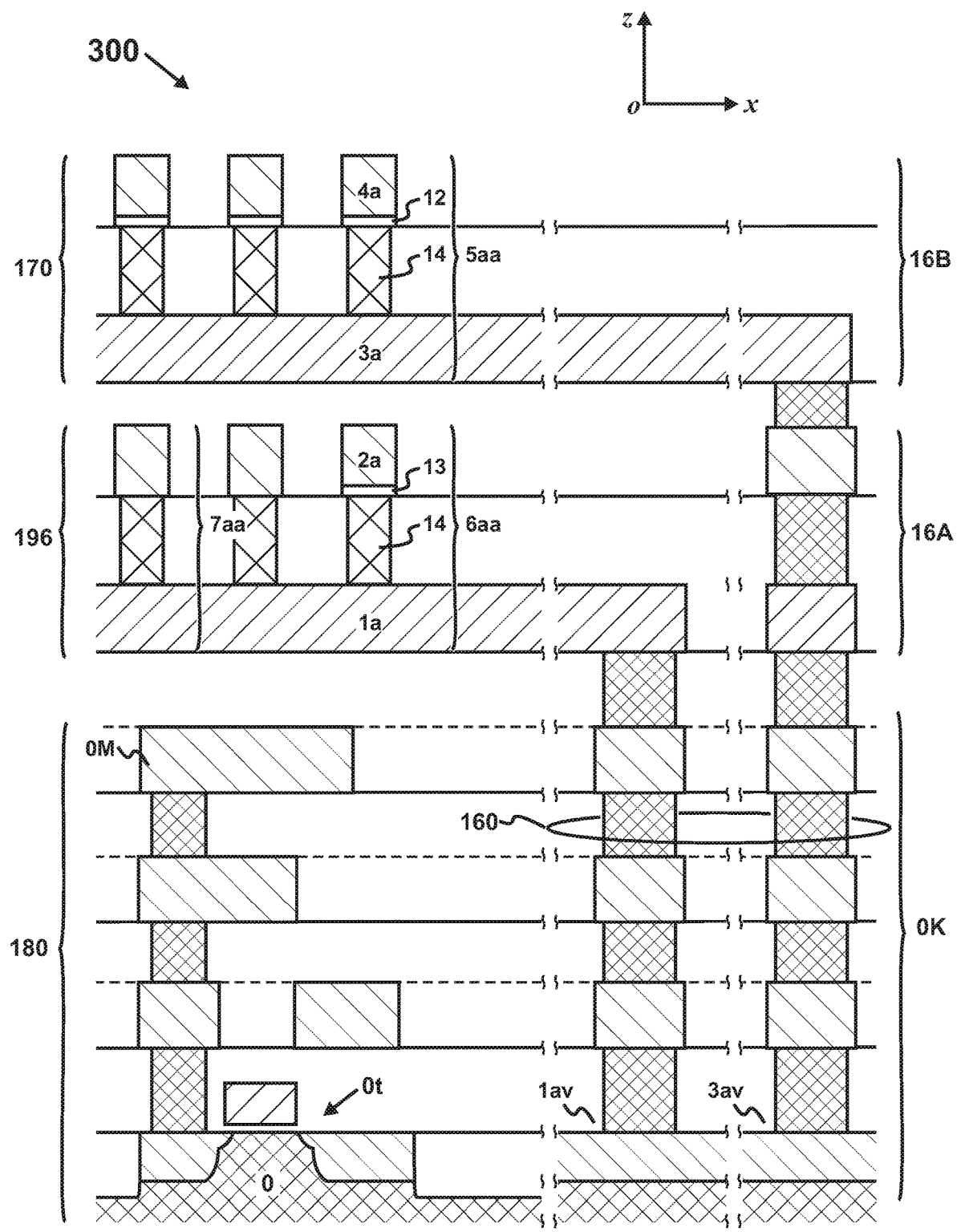
FIG. 11B is its detailed cross-sectional view.

FIG. 11A is a simplified cross-sectional view of a first preferred hybrid 3D-M block 300. Its first 3D-ROM array 196 is a 3D-P array while its second 3D-ROM array 170 is a 3D-W array. FIG. 11B is its detailed cross-sectional view. The 3D-P array 196 on the first memory level 16A comprises two types of memory cells: a high-resistance 3D-P cell 6aa and a low-resistance 3D-P cell 7aa (referring to FIG. 5B). The 3D-W array 170 on the second memory level 16B comprises just a single type of memory cells—3D-W cell 5aa (referring to FIG. 5A). FIG. 11C is a simplified cross-sectional view of a second preferred hybrid 3D-M block 300. It comprises three memory levels 16A-16C. The 3D-ROM array 196 on the memory level 16A is a 3D-P array, while the 3D-ROM Arrays 170a, 170b on the memory levels 16B, 16C are 3D-W arrays. It should be apparent to those skilled in the art more memory levels and other 3D-W/3D-P combinations are possible.

Figure 12A:
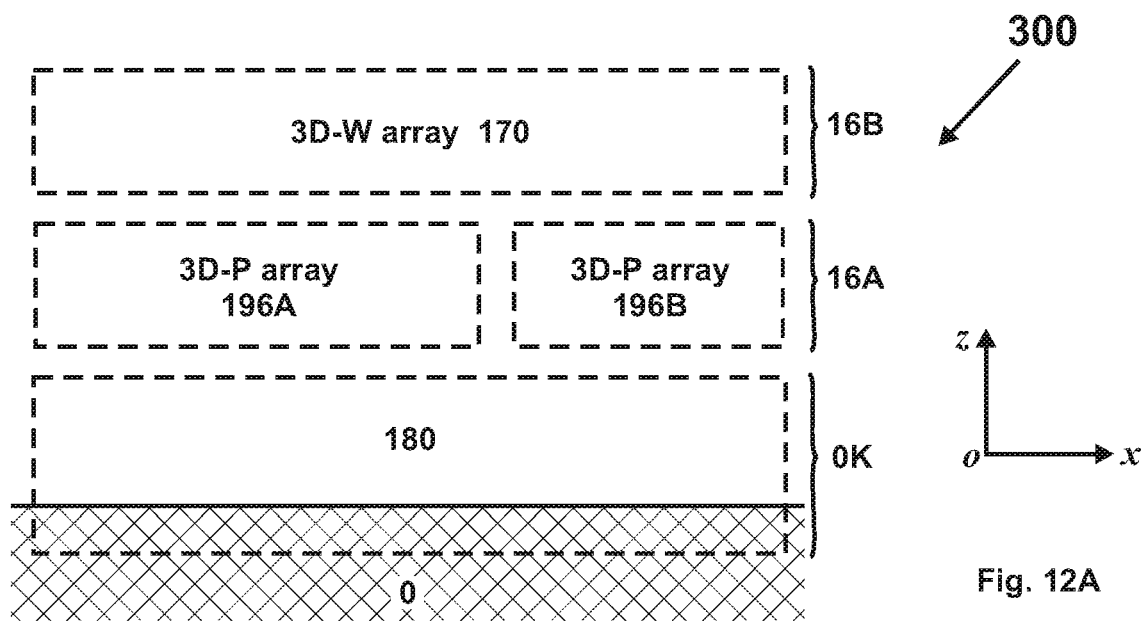
FIG. 12A is a simplified cross-section view of a third preferred hybrid 3D-M block.
Figure 12B:
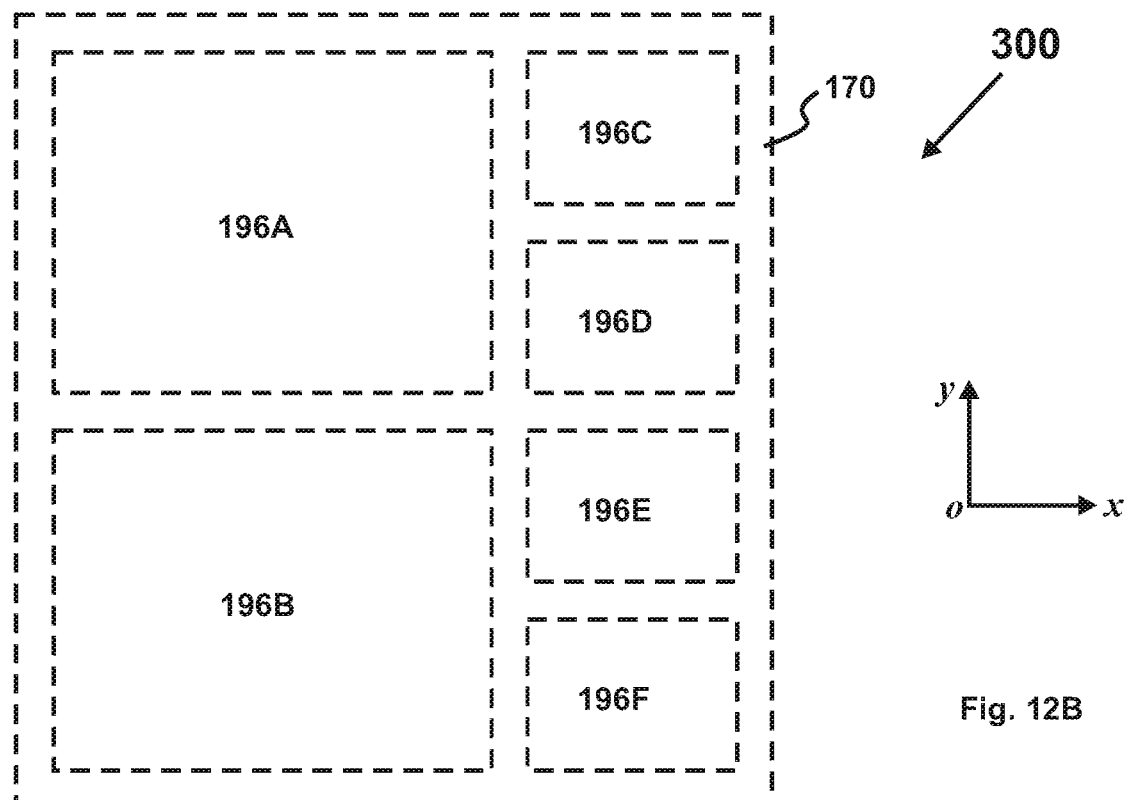
FIG. 12B is a substrate view of the projections of all 3D-M arrays in the third preferred hybrid 3D-M block.

FIGS. 12A-12B disclose a third preferred hybrid 3D-M block 300. FIG. 12A is a simplified cross-sectional view and FIG. 12B is a substrate view of the projections of all memory arrays. This preferred 3D-M block 300 comprises two memory levels 16A, 16B. The memory level 16B is the topmost memory level and comprises a single 3D-W array 170, while the memory level 16A is an intermediate memory level and comprises at least two side-by-side 3D-P arrays 196A, 196B (FIG. 12A). The 3D-W array 170 fully covers the 3D-P arrays 196A-196F (FIG. 12B). This preferred embodiment uses small 3D-P arrays 196A-196F because a smaller array has a faster speed.

While illustrative embodiments have been shown and described, it would be apparent to those skilled in the art that many more modifications than that have been mentioned above are possible without departing from the inventive concepts set forth therein. The invention, therefore, is not to be limited except in the spirit of the appended claims.

What is claimed is:

1. An integrated neuro-processor comprising three-dimensional memory (3D-M) array, comprising:
   a semiconductor substrate having transistors thereon;
   an array of neural storage-processing units (NSPU) on said semiconductor substrate, each of said NSPUs comprising at least a first 3D-M array, a second 3D-M array and a neuro-processing circuit, wherein
   said second 3D-M array stores at least a synaptic weight;
   said first 3D-M array stores at least a look-up table (LUT) of an activation function;
   said neuro-processing circuit is disposed on said substrate but below said first and second 3D-M arrays, wherein said neuro-processing circuit performs neural processing with said synaptic weight and said LUT;
   said first 3D-M array, said second 3D-M array and said neuro-processing circuit are communicatively coupled by a plurality of contact vias, wherein said contact vias do not penetrate any semiconductor substrate;
   wherein said first 3D-M array is physically closer to said semiconductor substrate than said second 3D-M array.

2. The integrated neuro-processor according to claim 1, wherein said second 3D-M array is a three-dimensional writable memory (3D-W) array.

3. The integrated neuro-processor according to claim 1, wherein said first 3D-M array is a three-dimensional printed memory (3D-P) array.

4. The integrated neuro-processor according to claim 1, wherein said first 3D-M array is smaller in size than said second 3D-M array.

5. The integrated neuro-processor according to claim 1, wherein
   said second 3D-M array is stacked above said first 3D-M array; and,
   said first 3D-M array is stacked above said semiconductor substrate.

6. The integrated neuro-processor according to claim 1, wherein said first and second 3D-M arrays at least partially overlap with said neuro-processing circuit.

7. An integrated neuro-processor comprising three-dimensional memory (3D-M) array, comprising:
   a semiconductor substrate having transistors thereon;
   an array of neural storage-processing units (NSPU) on said semiconductor substrate, each of said NSPUs comprising at least a first 3D-M array, a second 3D-M array and a neuro-processing circuit, wherein
   said second 3D-M array is a 3-D writable memory (3D-W) and stores at least a synaptic weight;
   said first 3D-M array is a 3-D printed memory (3D-P) and stores at least a look-up table (LUT) of an activation function;
   said neuro-processing circuit is disposed on said substrate but below said first and second 3D-M arrays, wherein said neuro-processing circuit performs neural processing with said synaptic weight and said LUT;
   said first 3D-M array, said second 3D-M array and said neuro-processing circuit are communicatively coupled by a plurality of contact vias, wherein said contact vias do not penetrate any semiconductor substrate.

8. The integrated neuro-processor according to claim 7, wherein said first 3D-M array is physically closer to said semiconductor substrate than said second 3D-M array.

9. The integrated neuro-processor according to claim 7, wherein
   said second 3D-M array is stacked above said first 3D-M array; and,
   said first 3D-M array is stacked above said semiconductor substrate.

10. The integrated neuro-processor according to claim 7, wherein said first and second 3D-M arrays at least partially overlap with said neuro-processing circuit.

11. The integrated neuro-processor according to claim 7, wherein said first 3D-M array is smaller in size than said second 3D-M array.

12. An integrated neuro-processor comprising three-dimensional memory (3D-M) array, comprising:
   a semiconductor substrate having transistors thereon;
   an array of neural storage-processing units (NSPU) on said semiconductor substrate, each of said NSPUs comprising at least a first 3D-M array, a second 3D-M array and a neuro-processing circuit, wherein
   said second 3D-M array stores at least a synaptic weight;
   said first 3D-M array stores at least a look-up table (LUT) of an activation function;
   said neuro-processing circuit is disposed on said substrate but below said first and second 3D-M arrays, wherein said neuro-processing circuit performs neural processing with said synaptic weight and said LUT;
   said first 3D-M array, said second 3D-M array and said neuro-processing circuit are communicatively coupled by a plurality of contact vias, wherein said contact vias do not penetrate any semiconductor substrate;
   wherein said first 3D-M array is smaller in size than said second 3D-M array.

13. The integrated neuro-processor according to claim 12, wherein said second 3D-M array is a three-dimensional writable memory (3D-W) array.

14. The integrated neuro-processor according to claim 12, wherein said first 3D-M array is a three-dimensional printed memory (3D-P) array.

15. The integrated neuro-processor according to claim 12, wherein said first 3D-M array is physically closer to said semiconductor substrate than said second 3D-M array.

16. The integrated neuro-processor according to claim 12, wherein
   said second 3D-M array is stacked above said first 3D-M array; and,
   said first 3D-M array is stacked above said semiconductor substrate.

17. The integrated neuro-processor according to claim 12, wherein said first and second 3D-M arrays at least partially overlap with said neuro-processing circuit.

* * * * *